United States Patent [19]

Bleckmann et al.

[11] 3,876,446
[45] Apr. 8, 1975

[54] MANUFACTURE OF POROMERIC MATERIALS

[75] Inventors: Gerhard Bleckmann, Lampertheim; Axel Sanner, Ludwigshafen; Lothar Schlemmer, Maxdorf; August Wigger, Frankenthal, all of Germany

[73] Assignee: Badische Anilin- & Soda-Fabrik Aktiengesellschaft, Ludwigshafen, Rhine, Germany

[22] Filed: Jan. 19, 1973

[21] Appl. No.: 325,214

[30] Foreign Application Priority Data
Jan. 20, 1972 Germany............................ 2002568

[52] U.S. Cl. ...................... 117/9; 117/10; 117/11; 117/93.31; 117/119.2; 117/135.5; 117/161 UC; 117/161 UN; 204/159.15
[51] Int. Cl. ............................. B44d 1/50; C08f 3/00
[58] Field of Search ..... 117/9, 10, 11, 93.31, 119.2, 117/161 UN, 161 UC, 135.5, DIG. 3; 204/159.15, 159.16

[56] References Cited
UNITED STATES PATENTS

| 3,376,158 | 4/1968 | Buser | 117/135.5 |
| 3,607,692 | 9/1971 | Sanner et al. | 117/93.31 |
| 3,640,753 | 2/1972 | Krausch et al. | 117/119.2 |

Primary Examiner—Michael Sofocleous
Assistant Examiner—John H. Newsome
Attorney, Agent, or Firm—Johnston, Keil, Thompson & Shurtleff

[57] ABSTRACT

Poromeric web materials are continuously manufactured by applying to a thin layer of ice crystals a textile fibrous structure and an aqueous solution or dispersion of a. polyethylenically unsaturated monomers having at least two polymerizable double bonds or mixtures of at least 0.1 percent w/w of such polyethylenically unsaturated monomers and monoethylenically unsaturated copolymerizable monomers and optionally high molecular weight polymers, or b. monoethylenically unsaturated monomers and high polymers having molecular weights of more than 10,000, cooling the whole to such an extent that at least 50 percent of the water crystallizes, irradiating the solidified structure with electromagnetic radiation having a wavelength of less than 0.70 μm to cause polymerization of the monomers, causing the structure to thaw, removing the material from the support and optionally washing the removed material, separating it from the water and finally drying it.

7 Claims, 1 Drawing Figure

3,876,446
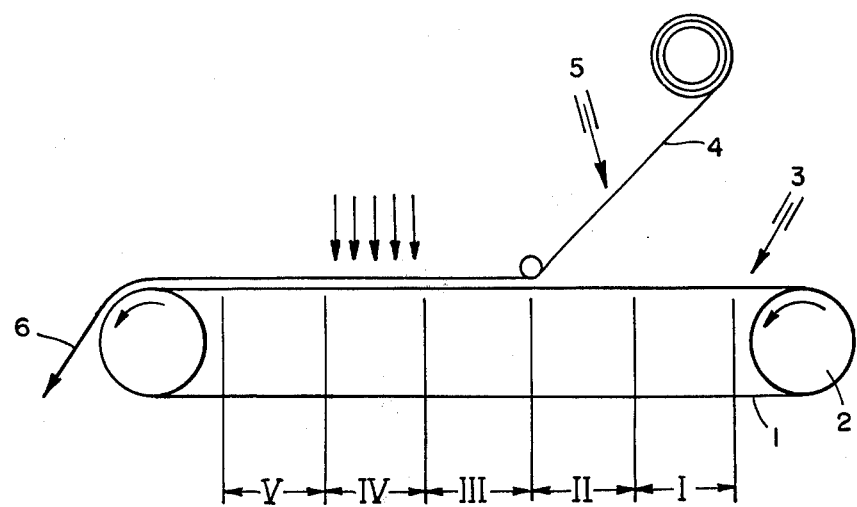

MANUFACTURE OF POROMERIC MATERIALS

This invention relates to a process for the manufacture of poromeric web materials, wherein ethylenically unsaturated monomers are continuously polymerized by irradiation to form an endless web.

The single FIGURE of the Drawing is an illustration of an advantageous embodiment of our invention.

It is known that polymerization of ethylenically unsaturated monomers may be initiated by irradiation. Sensitizers are frequently included and the operation is generally carried out at room temperature. The monomers are generally present in liquid form, i.e. in solution or in substance. It is also known to mass polymerize ethylenically unsaturated monomers in crystalline form. Finally, it is known to polymerize monoethylenically unsaturated monomers such as acrylonitrile, acrylamide and vinyl pyrrolidone in amorphous solidified solutions, e.g. in castor oil. These known processes, which are summarized in chapter IV of "Actions Chimique et Biologiques des Radiations", 10th Series, published by Masson et Cie 378/67, Paris 1966, provide conventional polymers generally in the form of powders or gels. An exception is the polymerization of pure methacrylic acid crystals by UV radiation, where small portions of fibrous polymers are formed side by side with amorphous polymers in one and the same crystal (C. H. Bamford, A. D. Jenkins and J. C. Ward, J. Polym. Sci., P.48, 1966, 37).

Furthermore, French Patent No. 1,414,088 discloses a method of cooling aqueous polymer dispersions until they freeze. This causes particles of polymer in the dispersion to freeze together to form fiberlike agglomerates. The resulting fibrous structures are used in aqueous suspensions either alone or together with finished fibers, for the manufacture of non-woven webs. A drawback of this method is that the fibrous structures do not generally retain their form on heating. Another drawback is that an additional process step is required after polymerization.

U.K. Patent No. 1,235,146 discloses a process for the manufacture of poromeric materials of polymers having a fibrous structure, wherein solutions or dispersions of monomers having at least two polymerizables double bonds or mixtures of such monomers with monoethylenically unsaturated monomers containing at least 0.01 percent w/w of monomers having two polymerizable double bonds are caused to solidify, either partially or completely, to form a mass of crystals and the solidified mass is irradiated to cause polymerization of the monomers and is then separated from the liquids present. This process may be carried out in the presence of non-woven webs of natural or synthetic fibers.

The published documents of Belgian Patent No. 739,121 (US : South African Patent 69/6643) describes a process for the manufacture of poromeric materials, in which fibrous webs are impregnated with solutions and/or dispersions of monoethylenically unsaturated monomers containing high molecular weight polymers in solution or dispersion, the impregnated webs are frozen with complete or partial solidification of the liquids to crystals, the solidified structures are irradiated to cause polymerization of the monomers, and the liquids are separated. The two last-named processes provide satisfactory poromeric materials but the nature of their surface depends on the type of web-like support used during polymerization of the monomers.

It is an object of the present invention to provide a process for the manufacture of poromeric materials by polymerization of ethylenically unsaturated monomers by irradiation, which materials have a uniform surface of which the texture may be varied.

The above object is achieved by the present invention.

The invention relates to a process for the continuous manufacture of poromeric materials in the form of webs, comprising a. producing a thin layer of ice crystals on a substrate,
b. applying to said layer of ice crystals (with at most partial thawing of the same) a fibrous web structure and an aqueous solution or dispersion of
   α. polyethylenically unsaturated monomers having at least two polymerizable double bonds or mixtures of at least 0.1 percent w/w of such polyethylenically unsaturated monomers with monoethylenically unsaturated copolymerizable monomers and optionally high molecular weight polymers, or
   β. monoethylenically unsaturated monomers and high polymers having molecular weights of more than 10,000,
c. cooling the resulting structure so that at least 50 percent w/w of the water freezes,
d. irradiating the solidified structure with electromagnetic radiation having a wavelength of less than 0.70 /μm to cause polymerization of the monomers,
e. causing the water in the said solidified structure to melt,
f. separating the resulting poromeric web material from the substrate, optionally washing said material and then separating it from water and drying it.

Thus in process step (b) an aqueous monomer composition, which may or may not contain high molecular weight polymers in dissolved or dispersed form, is applied to the layer of ice crystals.

A suitable substrate is for example a roll or preferably an endless belt. An endless steel belt has been found to be particularly suitable. The width of the poromeric web materials formed may of course vary within wide limits. For example, it may vary from a few centimeters to several meters, e.g. about 4 meters.

The invention is described below with specific reference to the use of an endless belt as substrate.

A thin layer of ice crystals is formed on the substrate by freezing a film of water.

In general, an ice layer of a few tenths of a millimeter is sufficient; thicknesses of from 0.2 to 0.5 mm, but also larger thicknesses, for example 3 mm, have been found to give satisfactory results. The lower limit may be set at 0.05 mm.

The layer of ice crystals is generally produced by freezing water. However, it is in some cases advantageous to add substances to the water to prevent the ice layer from separating from the substrate or from cracking. Numerous water-soluble substances are suitable additives, for example alcohols, aldehydes and ketones, organic acids and derivatives thereof capable of dissolving in water without decomposing, salts of organic and inorganic acids and in particular surface active substances such as are used as emulsifying and dispersing agents. The additions frequently affect the structure of the film of ice. Preliminary tests will show which of the additives is most suitable for the attainment of a desired structure. The additives are generally included in concentrations of from 0.1 to 30 percent and preferably from 1 to 10 percent, based on the aqueous solution.

The amount of water or aqueous solution used is such that the surface of the substrate is fully covered. Deviations of the substrate from the horizontal and irregularities in its surface may be compensated by increasing the amount of water or solution used.

The substrate carrying the film of liquid is then passed to a low-temperature zone. If a layer containing fine ice crystals is required, the cooling is carried out as rapidly as possible to low temperatures of from $-10°$ to $-35°C$ and in particular from $-10°$ to $-25°C$. If cooling is carried out slowly to, say, temperatures of only a few degrees, from $1°$ to $5°C$, below the freezing point of water or the aqueous solution, the layer of ice formed tends to contain coarse crystals and may also have a frostwork pattern on its surface.

The resulting ice layer is conveniently further cooled in order that the ice crystals do not melt completely and only partially thaw out, at most, when the web of fibrous material and the monomer solution or dispersion are applied thereto.

The web of fibrous textile material and the monomer solution or dispersion are applied to said cooled layer of ice crystals, either separately or together. One satisfactory method is to apply the web of fibrous material after it has been, say, impregnated, sprayed or sprinkled with the monomer solution or dispersion.

For every 100 parts of fibrous web material there are advantageously used from 20 to 500 parts of monomer together with any high polymer used. The main purpose of the web of textile material is to provide mechanical reinforcement.

Particularly suitable webs of textile material are nonwoven webs of natural or synthetic fibers or filaments, which may have been needle-punched in the usual manner. Other suitable materials are knitted or woven materials of natural or synthetic fibers or filaments which have preferably been roughened severely. The fibers or filaments may be, say, conventional wool, cellulose, cellulose acetate, viscose, polypropylene, polyamide (e.g. nylon 6 or nylon 6.6), polyacrylonitrile and/or polyethylene terephthalate fibers or filaments.

By further cooling, heat is removed from the applied aqueous solution or dispersion of monomers to such an extent that it freezes either substantially completely or at least to the extent of about 50 percent by weight. The solidified crystalline structure on the substrate is then irradiated with electromagnetic radiation to cause polymereization of the monomers. Cooling may be effected in conventional manner, for example by contact cooling, a satisfactory method being the spraying of the underside of the substrate with a cold liquid such as a salt solution or, advantageously, cooling brine, or with cold methanol or a cold glycol/water mixture.

The degree to which the fibrous web structure is embedded in the desired poromeric materials may be varied, for example by varying the amount of monomers or high polymers used or by pressing said fibrous structure against the layer of ice crystals to a greater or lesser extent during the freezing process.

The thickness of the frozen assembly is conveniently from 0.5 to 15 mm and in particular from 1.5 to 5 mm.

The polyethylenically unsaturated monomers which are suitable for our new process are those having at least two double bonds which can be polymerized by free radicals. Such free radical polymerization is initiated by electromagnetic irradiation, optionally in the presence of photoinitiators. Example of suitable monomers are polyolefinically unsaturated carboxylic acid esters, e.g. diesters of aliphatic or cycloalophatic diols, in particular alkane diols, having preferably from 2 to 10 carbon atoms and in particular from 2 to 6 carbon atoms, such as ethylene glycol, propylene glycol, butanediol-1,4, hexanediol-1,6 and cyclohexanediol-1,4, with $\alpha,\beta$-monoethylenically unsaturated monocarboxylic acids of from 3 to 5 carbon atoms, in particular acrylic and methacrylic acids but also crotonic acid, e.g. ethylene glycol diacrylate, ethylene glycol dimethacrylate, butandediol-1,4 diacrylate, butanediol-1,4 dimethacrylate, hexanediol-1,6 diacrylate and cyclohexanediol-1,4 diacrylate, moreover polyfunctional vinyl esters of polycarboxylic acids, in particular divinyl esters of aliphatic or aromatic dicarboxylic acids preferably containing from 4 to 8 carbon atoms and optionally having one olefinic double bond, such as divinyl oxalate, divinyl maleate and divinyl fumarate, vinyl esters of $\alpha,\beta$-monoolefinically unsaturated monocarboxylic acids preferably containing 3 to 5 carbon atoms, such as vinyl methacrylate, vinyl crotonate and, preferably, vinyl acrylate, allyl carboxylic acid esters, particularly of saturated or monoolefinically unsaturated dicarboxylic acids containing from 3 to 8 carbon atoms, such as diallyl phthalate, allyl acrylate, allyl methacrylate, diallyl maleate, diallyl oxalate, diallyl adipate and allyl $\alpha$-chloroacrylate. Such unsaturated carboxylic acid esters usually have two or three olefinic double bonds and from 5 to 20 and in particular from 5 to 14 carbon atoms and may, if desired, be derived from substituted carboxylic acids such as halocarboxylic acids, in particular monoolefinically unsaturated monocarboxylic acids substituted by chlorine atoms in the $\alpha$-position.

Other suitable polyolefinically unsaturated monomers are polyolefinically unsaturated carboxamides, e.g. methylene bisacrylamide and methylene bismethacrylamide and diamides, particularly those derived from $C_{2-6}$ aliphatic diamines and $\alpha,\beta$-monoolefinically unsaturated monocarboxylic acids preferably containing from 3 to 5 carbon atoms, such as N,N'-ethylene-bis-acrylamide, N,N'-ethylene-bis-methacrylamide and N,N-hexamethylene-bisacrylamide, and diethers of aliphatic or cycloaliphatic diols, in particular alkane diols, containing preferably from 2 to 10 and in particular from 2 to 6 carbon atoms, such as ethylene glycol and butanediol-1,4, and N-hydroxymethyl amides of $\alpha,\beta$-monoolefinically unsaturated $C_{3-5}$ monocarboxylic acids, such as N-methylol acrylamide and N-methylol methacrylamide.

Of particular interest as polyolefinically unsaturated monomers containing at least two polymerizable double bonds are the so-called "unsaturated polyesters" which form usual components in the manufacture of so-called unsaturated polyester resins and are described for example in p. Selden "Glasfaserverstarkte Kunststoffe" (Springer Verlag, 1967) pp. 8–18, incorporated herein by reference. In general, they have chain molecules containing recurring ester groups in the chains, at least two polymerizable olefinic double bonds and having molecular weight usually above 500 ad frequently between 500 and 5,000 or, in some cases, even higher, e.g. 8,000. Their manufacture, which is described for example in the above book by P. Selden, pp. 16–18, is generally carried out by polycondensing equivalent or approximately equivalent amounts of aliphatic, cycloaliphatic or aromatic dicarboxylic acids, in particular $\alpha,\beta$-olefinically unsaturated dicarboxylic acids, usually containing from 4 to 6 carbon atoms, or their anhydrides with diols, in particular with aliphatic, cycloaliphatic or araliphatic diols generally containing from 2 to 22 and in particular from 2 to 12 carbon atoms and optionally ether oxygen atoms. The unsaturated polyesters may also contain minor amounts, e.g. proportions of from 0.1 to 20 percent of their weight, of condensed units of mono-, tri- or other polyfunctional carboxylic acids and/or mono-, tri- or other polyhydric alcohols in the usual manner. The acid numbers of suitable unsaturated polyesters are generally between 5 and 100 preferably between 20 and 60.

Suitable unsaturated polyesters are for example those derived from alkanediols such as ethylene glycol, propylene glycol, butanediol-1,4, alkanediols, such as butene-2-diol-1,4, butene-3-diol-1,2, alkanediols containing oxygen atoms, such as diethylene glycol and triethylene glycol, and/or neopentyl glycol, with $\alpha,\beta$-olefinically unsaturated dicarboxylic acids, particularly maleic acid, but also fumaric acid, itaconic acid, mesaconic acid, citraconic acid, dihydromuconic acid, $\alpha$-methyleneglutaric acid and endomethylene tetrahydrophthalic acid. In the manufacture of the unsaturated polyesters, such unsaturated dicarboxylic acids are advantageously used in admixture with, say, from 25 to 75 percent by weight (based on the total dicarboxylic acids) of dicarboxylic acids containing no copolymerizable double bonds, such as phthalic acid, dihydrophthalic acid, tetrahydrophthalic and adipic acid.

The amount of unsaturated polyesters may generally be between 2 and 100 and preferably between 5 and 40 percent w/w, based on the total monomers. In addition to the unsaturated polyesters, other monomers having at least two double bonds may be included in any desired amounts. It is advantageous when at least 5 percent by weight of the total monomers containing at least two polymerizable double bonds are unsaturated polyesters.

Where unsaturated polyesters are used as the polyethylenically unsaturated monomers, the poromeric materials obtained have particularly good abrasion resistance and tensile strength.

In place of polyethylenically unsaturated monomers alone, mixtures of monomers may be used which contain at least 0.1 percent and advantageously at least 0.5 percent and preferably at least 5 percent by weight of such monomers in admixture with monoethylenically unsaturated monomers capable of free-radical copolymerization with the polyethylenically unsaturated monomers.

Suitable monoethylenically unsaturated monomers for the process of the invention are esters of $C_{3-5}$ $\alpha,\beta$-monoolefinically unsaturated monocarboxylic acids, particularly acrylates and/or methacrylates, of alkanols of from 1 to 8 and in particular of from 1 to 4 carbon atoms, and also acrylates and/or methacrylates of cycloalkanols having 5 or 6 carbon atoms in the ring or of polyhydric, particularly di- or trihydric, alcohols of from 2 to 6 carbon atoms, also acrylamides and/or methacrylamides or their N-methylol compounds or their N-methylol ethers of alcohols of from 1 to 4 carbon atoms. As examples of particularly suitable monomers of this type there may be mentioned the methyl, ethyl, n-propyl, n-butyl, isobutyl, n-hexyl, cyclohexyl and 2-ethylhexyl esters of acrylic and methacrylic acids, 2-hydroxyethyl acrylate, 1,4-butanediol monoacrylate, 3-chloro-2-hydroxypropyl acrylate, acrylamide, methacrylamide, N-methylol acrylamide, N-methylol methacrylamide, N-methylol acrylamide methyl ether and N-methylol methacrylamide n-butyl ether. These monomers may advantageously be used in admixture with each other. It may also be advantageous to replace up to 25 percent by weight of the monomers by acrylic or methacrylic acid. If hard, stiff products are desired, up to 50 percent of the monomers may be replaced by acrylic or methacrylic acid.

Monoethylenically unsaturated monomers which are also suitable, particularly in admixture with the above monomers, are vinyl esters of saturated aliphatic monocarboxylic acids of from 2 to 18 carbon atoms, such as vinyl acetate, vinyl propionate, vinyl n-butyrate, vinyl laurate and vinyl stearate, and also vinyl ethers of alcohols of from 4 to 8 carbon atoms, such as vinyl isobutyl ether and vinyl n-octyl ether; N-vinyl compounds, such as N-vinyl pyrrolidone and N-vinyl carbazole; vinyl halides, such as N-vinyl chloride and vinylidene chloride; monovinyl aromatic monomers having one benzene nucleus and 8 to 9 carbon atoms, such as styrene or vinyl toluene; and vinyl thioethers, such as 2-vinyl thioethanol.

If the monomer solutions or dispersions also contain high polymers, as described below, there is no need to use polyunsaturated monomers and the process may be carried out with monoethylenically unsaturated monomers only.

The concentration of monomers in the aqueous monomer solutions or dispersions may vary within wide limits. It is generally between 1 to 30 percent and preferably between 2 and 15 percent w/w, based on the solution or dispersion.

By dispersion we mean a fine distribution of a substance (in water in this case) irrespective of whether said substances is in a solid or liquid state. Thus the term monomer dispersion also embraces a monomer emulsion.

The dispersions may be prepared by conventional methods. Dispersion may be effected using conventional dispersing agents and optionally protective colloids. Such dispersing agents are described, for example, in Houben-Weyl "Methoden der organischen Chemie" Vol. XIV/1, "Makromolekulare Stoffe", Georg Thieme Verlag, Stuttgart, 1961, especially pp. 192–208, forming part of the present invention by reference. Examples of suitable dispersing agents are anionic dispersing agents, such as the alkali metal salts of fatty acids, alkali metal salts of acidic fatty alcohol sulfuric acid esters, particularly sodium sulfonates, alkali metal and ammonium salts of alkyl and alkylaryl sulfonic acids, salts of fatty acid condensation products with oxylalkylcarboxylic acids, aminoalkylcarboxylic acids and, in particular, alkali metal salts of sulfonated adducts of ethylene and fatty alcohols or alkyl phenols, which adducts contain for example from 5 to 30 and in particular from 8 to 20 ethylene oxide radicals, and also cationic dispersing agents, such as salts of alkyl amines, aryl, alkylaryl and resin amines and salts of quaternary ammonium compounds, such as N-dodecyl-N-trimethylammonium chloride. It is also possible to use non-ionic dispersing agents, for example the reaction products of alkylene oxides, particularly ethylene oxide, with fatty alcohols, fatty acids or alkylphenols containing preferably $C_{8-12}$ alkyl radicals. Further, it is possible to use mixtures of dispersing agents in our process, for example mixtures of non-ionic and anionic dispersing agents. The concentration of dispersing agents of the above kinds is generally between 0.1 and 5 percent by weight, based on the total dispersion. In special cases, it is also possible to operate without added dispersing agent.

As mentioned above, the aqueous monomer solutions or dispersions may contain high polymers.

Suitable high polymers, which usually have molecular weights of more than 10,000 (as determined by the method proposed by Ueberreither in Zeitschrift fuer Makromolekulare Chemi, Vol. 8, pp. 21–28 [1952]) are all synthetic high polymers as may be prepared by conventional polymerization and polycondensation processes, provided they are soluble or dispersible in water or are obtained, in their manufacture, in a dissolved or dispersed state. Suitable high polymers are for example homo- and/or co-polymers of monoethylenically and/or diethylenically unsaturated monomers, for example of mono- or di-olefins having preferably from 2 to 5 carbon atoms, such as ethylene, propylene, isobutylene, butadiene, chloroprene and isoprene, of $\alpha,\beta$-ethylenically unsaturated mono- and di-carboxylic acids, particularly those having from 3 to 5 carbon atoms, such as acrylic acid, methacrylic acid, maleic acid and itaconic acid and/or their optionally substituted amides, nitriles and/or esters, particularly with $C_{1-8}$ alkanols, such as methyl, ethyl, propyl, n-butyl, t-butyl, n-hexyl and 2-ethylhexyl esters of acrylic and methacrylic acids and diethyl maleate and di-n-butyl maleate, acrylamide, methacrylamide and N-n-butoxymethyl acrylamide, acrylonitrile, methacrylonitrile, of vinyl aromatic monomers which, such as styrene, $\alpha$-methylstyrene, divinylbenzene and the vinyltoluenes, generally have only one benzene nucleus, of vinyl esters of generally $C_{2-12}$ monocarboxylic acids, in particular vinyl acetate, vinyl propionate, vinyl butyrate and vinyl laurate, of vinyl halides, particularly vinyl chloride, vinylidene chloride and vinyl fluoride, of vinyl ethers, particularly of $C_{1-4}$ alkanols, such as vinyl methyl ether and vinyl isobutyl ether, of heterocyclic vinyl compounds, such as vinyl pyridines, N-vinyl pyrrolidone and N-vinyl imidazolium salts, such as N-vinyl-N-methyl imidazolium chloride and N-vinyl-N-methyl imidazolium methosulfate. Other suitable high polymer plastics are, for example, saturated linear polyesters which contain recurring carboxylic ester groups in the backbone and which have been produced in conventional manner, for example polyethylene glycol terephthalate, polyurethanes, particularly polycondensation products of hexamethylene diisocyanate and alkanediols having from 2 to 6 carbon atoms, such as glycol and hexanediol-1,6, synthetic linear polyamides having recurring units of the general formula -CONH- in the chain molecules, for example poly-ϵ-caprolactam, polylaurin-lactam and polycondensation products of aliphatic dicarboxylic acids such as adipic acid or suberic acid, and aliphatic diamines such as hexamethylene diamine, decamethylene diamine and 4,4'-diaminodicyclohexylmethane, polyvinyl alcohols and their modified products, poly-1,2-alkylene oxides particularly polyethylene oxides and poly-1,2-propylene oxides, polyacetals such as polyformaldehyde, and polycarbonates, polyureas, cellulose esters and cellulose ethers, particularly cellulose acetate, and also polyamides such as polyethylene imine.

The polymers and polycondensates of the above kind may be manufactured in conventional manner and may be dissolved or dispersed in water. It is advantageous to use solution or emulsion polymers, for example in the form of solutions or dispersions as obtained in their manufacture. Alternatively, solutions or dispersions may be used which have been prepared from the polymers or polycondensates for example from polyethylene, synthetic polyamides, polyalkylene oxides or polyformaldehyde. In the manufacture of the polymer dispersions by emulsion polymerization or of the so-called secondary dispersions, conventional dispersing agents and protective colloids may be used, suitable examples of which have been given above.

Of particular interest are aqueous polymer dispersions such as are conventionally used as such as binders, particularly binders for non-woven webs. Particularly advantagous are aqueous dispersions based on homo- and co-polymers of acrylic and/or methacrylic acid derivatives such as acrylates and/or methacrylates with alkanols of from 1 to 8 and in particular from 1 to 4 carbon atoms, with cycloalkanols of 5 or 6 carbon atoms in the ring or with polyhydric, in particular di- or tri-hydric, alcohols of from 2 to 6 carbon atoms, also of acrylamides and/or methacrylamides or their N-methylol compounds or their N-methylol ethers of alcohols of from 1 to 4 carbon atoms, and of acrylic and-/or methacrylic acids. Suitable examples are homo- and/or co-polymers of methyl, ethyl, n-propyl, n-butyl, isobutyl, n-hexyl, 2-ethylhexyl and cyclohexyl esters of acrylic and methacrylic acids, of 2-hydroxyethyl acrylate, 1,4-butanediol monoacrylate, 3-chloro-2-hydroxypropyl acrylate, acrylamide, methacrylamide, N-methylol acrylamide, N-methylol acrylamide methyl ether and N-methylol methacrylamide n-butyl ether. Also advantageous are aqueous polymer dispersions based on copolymers with other usual comonomers, such as styrene, which dispersions contain at least 40 percent by weight of the above acrylic or methacrylic derivatives. Also advantageous are aqueous polymer dispersions based on copolymers of butadiene or on vinyl esters, particularly those of carboxylic acids having from 2 to 4 carbon atoms.

Also of interest are aqueous dispersions of vinyl halide homo- and co-polymers, such as vinyl chloride homo- and co-polymers, styrene homo- and co-polymers, polyisobutylene, synthetic polyamides and polyurethanes, and also aqueous solutions of polyvinyl pyrrolidone.

The concentration of high polymers of the above kinds in the monomer solutions or dispersions may be varied within wide limits. It is generally between 0.1 and 30 percent and preferably between 2 and 20% by weight, based on the total weight of the solution or dispersion containing the monomers and high polymers. The ratio of monomers to high polymers, by weight, is generally in the range 0.5:1 to 10:1 and advantageously from 3:1 to 8:1.

The solutions or dispersions of monomers and high polymers may advantageously also contain small amounts of photoinitiators, i.e. compounds which disintegrate into free radicals under the action of light or which produce free radicals as a result of reactions caused by light, which free radicals then initiate polymerization. Examples of suitable photoinitiators are vicinal ketaldonyl compounds, such as diacetyl and benzil, α-ketaldonyl alcohols, such as benzoin, acyloin ether, such as benzoin methyl ether and benzoin isopropyl ether, and α-substituted aromatic acycloins, such as α-methyl benzoin, aromatic ketones and aldehydes, such as benzophenone, propiophenone and benzaldehyde. The photoinitiators are generally added in amounts of from 0.001 to 10 percent preferably from 0.01 to 3 percent by weight, based on the monomers. Inorganic photosensitizers which disintegrate into radicals or produce free radicals under the action of light, are also suitable, for example uranyl salts, copper salts and salts of trivalent iron with organic acids, optionally in admixture with peroxides such as hydrogen peroxide and potassium persulfate.

Irradiation of the solidified crystalline web structure for polymerization of the monomers is effected with electromagnetic radiation having a wavelength of less than 0.7 $\mu$m and advantageously less than 0.39 $\mu$m. Suitable radiation, for example, is that from mercury vapor lamps, xenon lamps or fluorescent tubes. Daylight or sunlight may also be used. Exposure times of some minutes are usually necessary to polymerize the monomers. For example, exposure times of from 2 to 30 minutes and in particular from 5 to 15 minutes have been successfully used when irradiating with ultraviolet light. The exposure time required may be readily determined by simple experiment. If high-energy radiation is used, for example light having a wavelength of less than 0.3 $\mu$m, the presence of photoinitiators is no longer necessary. However, photoinitiators must be included when irradiation is carried out with light in the visible and ultraviolet regions of the spectrum at wavelengths which are longer than those corresponding to the absorption spectra of the materials to be polymerized. The frozen structure is advantageously cooled during polymerization in order to remove the heat of polymerization.

In the process of the invention, it is important that polymerization of the monomers takes place by irradiation in the presence of finely divided ice crystals. During polymerization, the monomers and optionally high polymers are present in a specific arrangement determined by the crystallization of the water contained in the monomer solution or dispersion. Thus the process of the invention involves polymerization of monomers on a crystalline matrix, i.e. in a specific crystalline structure-former. Those points at which the ice crystals of the frozen monomer solution or dispersion are present during polymerization of the monomers will subsequently form the pores of the poromeric material.

In our process, the conversion rate achieved by polymerization by irradiation is generally between 60 and 90 percent by weight or more, based on the monomers.

Following the photopolymerization, the frozen web structure is warmed to caused the ice crystals to melt. The resulting poromeric web materials are then removed from the substrate and separated from water and any residual monomers and high polymers, if necessary by washing and squeezing, and are then dried.

An advantageous embodiment of the process of the invention in continuous form is described below with reference to the accompanying drawing.

An endless belt 1 driven by a plurality of rolls 2 is used as substrate, a layer of water 3 being applied at one end of said belt. The belt is then moved through a cooling zone I, in which the layer of water is frozen to a layer of ice crystals, further cooling to −20°C being effected in the cooling zone II. At the end of this second cooling zone, the web of textile material 4, impregnated with the aqueous solution or dispersion 5, is placed on the layer of ice crystals on the belt and passed, together with the belt, to a cooling zone III, in which the monomer solution or dispersion is frozen. The frozen web structure is passed through the irradiating/cooling zone IV for polymerization of the monomers and then through a thawing zone V. The resulting poromeric web material 6 is separated from the endless belt used as substrate and is optionally washed with water, freed from water by squeezing and dried. The best belt speed depends for example on the cooling zones and on the irradiating zone. Speeds ranging from 15 to 200 cm/min have been successfully used.

The poromeric materials obtained possess a fibrous to porous structure. They are capable of "breathing", i.e. they are permeable to water vapor and air. As the amount of polyunsaturated monomers in the monomer solutions or dispersions increases, the poromeric materials have a more fibrous character, whilst the porous character tends to predominate under reverse conditions. The structure of the thin layer of ice crystals produced at the commencement of the manufacture of the poromeric materials is transferred through the frozen monomer solutions or dispersions and finally affects the surface structure of the resulting poromeric materials. An ice layer containing fine crystals leads to leathery to velvety poromeric materials. An ice layer containing coarse crystals, which may also show a surface frostwork pattern, also imparts its structure to the poromeric materials. Such frostwork patterns may be emphasized by dyeing the poromeric materials. The frostwork patterns may penetrate right through the poromeric materials and show up on the surface of said materials remote from the substrate. This is particularly so when a high ratio of polymer to fibrous web is used. On account of their decorative effect, such materials are particularly suitable for use as wall coverings.

An advantage of the process of the invention is the even surface of the poromeric materials obtained, particularly on that side thereof which was in contact with the substrate, this being particularly important in the manufacture of leather-like or velvet-like products. As described above, the surface of the poromeric materials may be varied in a controlled manner by modifying the layer of ice crystals. Undersirable small irregularities in the substrate surface may be compensated by the layer of ice. A particular advantage is that the poromeric materials do not stick to the substrate. This means that the substrate is kept free from adhering polymer, which would cause surface irregularities in the poromeric materials where and endless belt is used.

The products are suitable as base materials for leather substitutes, for use as shoes upper, upholstery leather and bag leather, and are also suitable as textile wall-covering materials, where products having decorative frostwork patterns are particularly interesting. The products also have medical applications.

EXAMPLES

The experiments listed in the Tables below were carried out on an apparatus as illustrated in the accompanying drawing.

Irradiation was carried out with fluorescent tubes of the type Osram L 40 W/705. The photoinitiator used was benzoin isopropyl ether in a concentration of 1 percent by weight, based on the monomers used. The dispersing and wetting agent in all experiments was sulfonated castor oil in a concentration of 0.4 percent by weight, based on the aqueous monomer composition. The yield was between 60 and 100 percent. The amount of polymer in the end product was adjusted by controlling the rate of application of the monomer composition and the concentration of the monomers and high polymers therein (together between 8 and 12 percent by weight based on the total solution or dispersion). The length of the individual zones was approximately as follows, based on the total length of the belt:

| zone I | 10% |
|---|---|
| zone II | 4% |
| zone III | 15% |
| zone IV | 40% |
| zone V | 15% |

Examples 1 to 12 illustrate methods of preparing materials by the process of the invention.

Experiments 13 and 18 demonstrate how the appearance and properties of the products may be varied by the process of the invention. It is also clearly shown how a given structure may be maintained over a wide range of speeds.

The parts and percentages are by weight. The K values were determined by the method proposed by H. Fikenstscher in "Cellulose-Chemie", Vol. 13, pp. 58 et sez. (1932).

| No. | Monomers used (parts) | High polymers used (parts — dry weight) | Composition of textile web and weight in g/m² | Belt speed in cm/min. | Ice crystal layer | Temperature of cooling zone I in °C | Proportion of polymer in product (%) | Appearance of poromeric material |
|---|---|---|---|---|---|---|---|---|
| 1 | butanediol-1,4-diacrylate (6) ethyl acrylate (74) acrylic acid (3) | 40% aqueous dispersion of a copolymer of 85 parts of butyl acrylate, 7 parts of acrylica acid, 3 parts of butanediol-1,4 diacrylate and 5 parts of N-methylol acrylamide (17) | spun-bonded web of polypropylene 130 | 30 | water containing 4% of sulfonated castor oil | −19 | 55 | leather-like, no frost pattern, smooth surface |
| 2 | as Example 1 | as Example 1 | as Example 1 | 30 | water containing 1% of dioxane | −3 | 55 | leather-like, very pronounced frost pattern in transmitted light and on dyeing, undamaged underside |
| 3 | ethylene glycol diacrylate (14) butanediol-1,4 monoacrylate (29) vinyl propionate (57) | — | web of carded rayon staple 140 | 10 to 40 | as Example 1 | −19 | 45 | leather-like, no frost pattern, smooth surface |
| 4 | unsaturated polyester+ of 1 part of maleic acid, 1 part of phthalic acid, 2 parts of propylene glycol and 2.3 parts of dipropyl glycol (29) n-butyl acrylate (42) vinyl isobutyl ether (29) | — | as Example 4 | 10 | as Example 1 | −19 | 48 | leather-like, no frost pattern, underside undamaged |
| 5 | unsaturated polyester+ as in Example 5 (29) 2-hydroxyethyl vinyl thioether (29) ethyl acrylate (42) | — | as Example 4 | 10 | as Example 1 | −19 | 50 | ditto |
| 8 | allyl acrylate (6) n-butyl acrylate (42) sodium salt of vinylsulfonic acid (6) | as Example 1 | spun-bonded web of polyamide 75 | 35 | water containing 4% of the adduct of 40 moles of ethylene oxide and 1 mole of castor oil | −15 | 49 | leather-like, no frost pattern, underside smooth |
| 9 | diallyl maleate (6) ethyl acrylate (35) n-butyl acrylate (42) | 40% aqueous dispersion of a copolymer of 50 parts of styrene, 45 parts of n-butyl acrylate, 5 parts of N-methylol methacrylamide | web of carded "Perlon" 170 | 25 | ditto | −19 | 60 | ditto |
| 10 | ethylene glycol diacrylate (6) n-butyl acrylate (70) N-methylol acrylamide (7) | 50% aqueous dispersion of 89 parts of vinylidene chloride and 11 parts of methyl acrylate (17) | web of carded polyamide/polyester 130 | 30 | as Example 7 | −19 | 50 | leather-like, no frost pattern |
| 11 | butanediol-1,4 monoacrylate (96) | polyacrylamide (K value 4) | web of carded rayon staple | 25 | as Example 7 | −19 | 45 | ditto |
| 12 | ditto | polyacrylic acid (K value 150) (3) | ditto | 25 | ditto | −19 | 45 | ditto |
| 13 | ethyl acrylate (97) | polyethylene imine (mol.w. about 30,000) (3) | web of carded rayon staple | 25 | as Example 7 | −19 | 45 | leather-like, no frost pattern |
| 14 | bis-N-methyl acrylamide butanediol-1,4 ether (24) butanediol-1,4 monoacrylate (53¾) | 50% aqueous dispersion of polyvinyl propionate (17) | ditto | 25 | as Example 1 | −19 | 40 | ditto |
| 15 | butanediol-1,4 diacrylate (23) butanediol-1,4 monoacrylate (60) | as Example 1 | polypropylene spun-bonded web 75 | 15 to 90 | water containing 2% of sodium sulfate | −3 | 75 | coarse frost pattern, very pronounced lamellae, highly decorative effect, no adhesion to belt |
| 16 | ditto | ditto | ditto | 10 to 100 | water containing 1% of dioxane | −3 | 75 | ditto |
| 17 | ditto | ditto | ditto | 20 to 90 | water containing 1% of urea | −3 | 75 | ditto |
| 18 | ditto | ditto | ditto | 10 to 100 | water containing 10% of an adduct of 40 moles of ethylene oxide and 1 mole of castor oil | −19 | 75 | towelling-like surface, smooth underside |

+here the unsaturated polyester serves as a polyethylenically unsaturated monomer

| No. | Monomers used (parts) | High polymers used (parts — dry weight) | Composition of textile web and weight in g/m² | Belt speed in cm/min. | Ice crystal layer | Temperature of cooling zone I in °C | Proportion of polymer in product (%) | Appearance of poromeric material |
|---|---|---|---|---|---|---|---|---|
| 19 | ditto | ditto | ditto | 10 to 100 | ditto | −19 | 60 | velvet-like surface, smooth underside |
| 20 | ditto | ditto | ditto | 10 to 100 | ditto | −19 | 45 | leather-like, very soft handle, no undesirable frost pattern |
| 21–33 | ethylene glycol diacrylate (13) propylene glycol monoacrylate (30) methyl acrylate (40) | as Example 1 | polypropylene spun-bonded web | | | | | as in Examples 16 to 20 but with a harder handle |
| 33–40 | butanediol diacrylate (23) vinyl pyrrolidone (43) n-butyl acrylate (17) | ditto | ditto | | | | | as in Examples 16 to 20 but with a harder handle |

We claim:

1. A process for the continuous manufacture of poromeric web materials, comprising
   a. producing a thin layer of ice crystals on a substrate,
   b. applying to said layer of ice crystals with at most partial thawing of the same a fibrous web structure and an aqueous dispersion of a mixture of polyethylenically unsaturated monomers having at least two polymerizable double bonds, copolymerizable monoethylenically unsaturated monomers and high polymers, the amount of the polyethylenically unsaturated monomers being at least 0.1 percent w/w based on the total monomers, the amount of the high polymers being between 0.1 and 30 percent w/w, based on the total dispersion and the ratio of monomers to high polymers being from 0.5:1 to 10:1,
   c. cooling the resulting structure to such an extent that at least 50 percent w/w of the water therein freezes,
   d. irradiating the solidified structure with electromagnetic radiation having a wavelength of less than 0.70 μm to cause polymerization of the monomers,
   e. causing the water in the said structure to melt,
   f. separating the resulting poromeric web material from the substrate, separating it from the water and drying it.

2. A process as claimed in claim 1, wherein the poromeric web material obtained, after removal from the substrate, is washed, separated from the water and dried.

3. A process as claimed in claim 1, wherein the structure containing fibrous material and ice crystals is irradiated with electromagnetic radiation having a wavelength of less than 0.70 μm to cause polymerization of the monomers in the presence of a photoinitiator.

4. A process as claimed in claim 1, wherein the polyethylenically unsaturated monomers having at least two polymerizable double bonds are selected from the group consisting of diesters of $C_{2-10}$ aliphatic or cycloaliphatic alcohols and $C_{3-5}$ α,β-monoethylenically unsaturated monocarboxylic acids, vinyl esters of α,β-monoolefinically unsaturated $C_{3-5}$ monocarboxylic acids, divinyl esters of $C_{4-8}$ dicarboxylic acids, allyl esters of $C_{3-8}$ dicarboxylic acids, methylene bisacrylamide, methylene bis-methacrylamide, diamides of $C_{2-6}$ aliphatic diamines and α,β-monoolefinically unsaturated $C_{3-5}$ carboxylic acids, diethers of $C_{2-10}$ aliphatic or cycloaliphatic diols and N-hydroxymethylamides of α,β-monoolefinically unsaturated $C_{3-5}$ monocarboxylic acids and polyethylenically unsaturated polyesters.

5. A process as claimed in claim 1, wherein monoethylenically unsaturated monomers are selected from the group consisting of esters of $C_{3-5}$ α,β-monoolefinically unsaturated monocarboxylic acids with $C_{1-8}$ alkanols, acrylamides, methacrylamides, vinyl esters of $C_{2-18}$ saturated aliphatic carboxylic acids, N-vinyl pyrrolidone, N-vinyl carbazole, vinyl halides and monovinyl aromatic monomers.

6. A process as claimed in claim 1, wherein high polymers are used in aqueous dispersion and are selected from the group consisting of homopolymers and copolymers of acrylates of $C_{1-8}$ alkanols, methacrylates of $C_{1-8}$ alkanols, acrylamides, methacrylamides, N-methylol compounds of acrylamides, N-methylol compounds of methacrylamides, acrylic acid, methacrylic acid, vinyl esters of $C_{2-18}$ aliphatic monocarboxylic acids, vinyl halides, styrene and mixtures of said homopolymers and copolymers.

7. A process as claimed in claim 1 wherein said monomers are butanediol-1,4 diacrylate and butanediol-1,4 monoacrylate and wherein said high polymer is a copolymer of butyl acrylate, acrylic acid, butanediol-1,4 diacrylate and N-methylol acrylamide.

* * * * *

UNITED STATES PATENT AND TRADEMARK OFFICE
CERTIFICATE OF CORRECTION

PATENT NO. : 3,876,446

DATED : April 8, 1975

INVENTOR(S) : Gerhard Bleckmann, Axel Sanner, Lothar Schlemmer snf August Wigger It is certified that error appears in the above-identified patent and that said Letters Patent are hereby corrected as shown below:

In the heading on the first page, "Foreign Application Priority Data" should read:
--Jan. 20, 1972 Germany..2202568--

Signed and Sealed this

Thirteenth Day of November 1979

[SEAL]

Attest:

RUTH C. MASON
Attesting Officer

LUTRELLE F. PARKER
Acting Commissioner of Patents and Trademarks